US012675838B2

(12) United States Patent　　　(10) Patent No.:　US 12,675,838 B2

Sun et al.　　　(45) Date of Patent:　　　Jul. 7, 2026

(54) METHOD AND CHIP FOR PICTURE PROCESSING, AND STORAGE MEDIUM

(71) Applicant: GREATER SHINE LIMITED, New Taipei City (TW)

(72) Inventors: Wei Sun, Shanghai (CN); Yehua Zhu, Shanghai (CN)

(73) Assignee: GREATER SHINE LIMITED, New Taipei City (TW)

( * ) Notice: Subject to any disclaimer, the term of this patent is extended or adjusted under 35 U.S.C. 154(b) by 236 days.

(21) Appl. No.: 18/659,769

(22) Filed: Jun. 24, 2024

(65) Prior Publication Data

US 2024/0331081 A1　　　Oct. 3, 2024

Related U.S. Application Data

(63) Continuation of application No. PCT/CN2022/121253, filed on Sep. 26, 2022.

(30) Foreign Application Priority Data

Nov. 9, 2021　(CN) .......................... 202111318140.X

(51) Int. Cl.
　*G06T 1/60*　　　(2006.01)
　*G06T 1/20*　　　(2006.01)
　*G06T 7/20*　　　(2017.01)
(52) U.S. Cl.
　CPC ................. *G06T 1/60* (2013.01); *G06T 1/20* (2013.01); *G06T 7/20* (2013.01); *G06T 2207/20016* (2013.01); *G06T 2207/30241* (2013.01)

(58) Field of Classification Search
　CPC .... G06T 1/60; G06T 1/20; G06T 7/20; G06T 2207/20016; G06T 2207/30241;
　(Continued)

(56) References Cited

U.S. PATENT DOCUMENTS

| 5,400,087 | A | * | 3/1995 | Uramoto | .............. H04N 19/523 |
| | | | | | 375/E7.113 |
| 5,594,813 | A | * | 1/1997 | Fandrianto | ........... H04N 19/433 |
| | | | | | 375/E7.113 |

(Continued)

FOREIGN PATENT DOCUMENTS

| CN | 101227611 | A | 7/2008 |
| CN | 102263947 | A | 11/2011 |

(Continued)

OTHER PUBLICATIONS

International Search Report in the international application No. PCT/CN2022/121253, mailed on Dec. 15, 2022. 5 pages with English translation.

(Continued)

*Primary Examiner* — Shahbaz Nazrul

(74) *Attorney, Agent, or Firm* — BAYES PLLC

(57)　　　　ABSTRACT

A method and a chip for picture processing, and a storage medium are provided. The method includes: data of a search window is loaded from a memory cell array, and the data of the search window data is cached to a register array; grouping search is performed on the register array based on motion trajectories of multiple samples of a current picture, and sample data of reference points corresponding to the multiple sample points is outputted in parallel; and sample data of the multiple sample points is determined based on the sample data of the reference points.

19 Claims, 6 Drawing Sheets

(58) Field of Classification Search
CPC .. G06T 1/0007; H04N 19/423; H04N 19/433;
H04N 19/436; H04N 19/56; H04N
19/563; H04N 19/57; Y02D 10/00
See application file for complete search history.

(56) References Cited

U.S. PATENT DOCUMENTS

| | | | | |
|---|---|---|---|---|
| 6,925,123 | B2 * | 8/2005 | Subramaniyan | H04N 19/56 |
| | | | | 375/E7.122 |
| 7,693,219 | B2 * | 4/2010 | Yan | H04N 19/57 |
| | | | | 348/420.1 |
| 2002/0009144 | A1 * | 1/2002 | Ishihara | H04N 19/51 |
| | | | | 375/E7.102 |
| 2002/0114394 | A1 | 8/2002 | Ma | |
| 2004/0190620 | A1 * | 9/2004 | Alfonso | H04N 19/56 |
| | | | | 375/E7.1 |
| 2011/0293012 | A1 | 12/2011 | Au | |

FOREIGN PATENT DOCUMENTS

| | | |
|---|---|---|
| CN | 104620582 A | 5/2015 |
| CN | 113207004 A | 8/2021 |

OTHER PUBLICATIONS

Written Opinion of the International Search Authority in the international application No. PCT/CN2022/121253, mailed on Dec. 15, 2022. 6 pages with English translation.
Bruno Zatt et al: "Run-time adaptive energy-aware Motion and Disparity Estimation in Multiview Video Coding", Design Automation Conference (DAC), 201148th ACM/EDAC/IEEE, IEEE, Jun. 5, 2011 (Jun. 5, 2011), pp. 1026-1031, XP031927830, ISBN: 978-1-4503-0636-2, abstract, sections 1, 3, 4.
Supplementary European Search Report in the European application No. 22891669.8, mailed on Oct. 2, 2025.

* cited by examiner

| Outputted reference point ■ | Integer reference point ⊠ | Decimal reference point ◨ | Interpolation reference point ◉ |
|---|---|---|---|

First group of selecting
modules (16-to-4)

Second group of selecting
modules (64-to-16)

METHOD AND CHIP FOR PICTURE PROCESSING, AND STORAGE MEDIUM

CROSS-REFERENCE TO RELATED APPLICATION

This application is a continuation of International Application No. PCT/CN2022/121253 filed on Sep. 26, 2022, which claims priority to Chinese Patent Application No. 202111318140.X, filed on Nov. 9, 2021, and entitled "PICTURE PROCESSING METHOD, CHIP, ELECTRONIC DEVICE, AND STORAGE MEDIUM", the disclosure of the referenced applications are hereby incorporated by reference in their entirety.

BACKGROUND

In the motion compensation technology, a motion trajectory of a sample is predicted according to the relationship between pictures, and sample data of a reference point is read from a previous picture according to the predicted motion trajectory (including an offset in X direction and an offset in Y direction), to obtain sample data of a sample in a current picture.

The difficulty in the hardware design of the motion compensation technology is that sample data of multiple reference points in the previous picture is acquired simultaneously within one clock cycle. However, due to the randomness and real-time of the motion trajectory, the motion trajectory of the reference point is irregular. When the sample data of the reference point is read, there is a problem of memory cell access conflict caused by that the sample data of multiple reference points may be stored in the same memory cell.

SUMMARY

Embodiments of the present disclosure relates to a picture processing technology, in particular to, a method and a chip for picture processing, an electronic device and a storage medium.

The technical scheme of the present disclosure is implemented as follows.

In a first aspect, there is provided a method for picture processing including following operations.

Data of a search window is loaded from a memory cell array, where sample data of a reference picture is stored in the memory cell array.

The data of the search window is cached to a register array.

Grouping search is performed on the register array based on motion trajectories of multiple samples in a current picture, and sample data of reference points corresponding to the multiple samples is outputted in parallel.

Sample data of the multiple samples is determined based on the sample data of the reference points.

In a second aspect, there is provided a chip for picture processing including a memory cell array, a register array, and a processor.

The memory cell array is configured to store sample data of a reference picture.

The register array is configured to cache data of a search window.

The processor is configured to: load the data of the search window from the memory cell array and cache the data of the search window to the register array; read, in parallel, based on motion trajectories of multiple samples in a current picture, sample data of reference points corresponding to the multiple samples from the register array; and determine sample data of the multiple samples based on the sample data of the reference points.

In a third aspect, there is provided a non-transitory computer-readable storage medium having stored a computer program thereon that, when executed by a processor, causes the processor to implement the operations of the foregoing method.

DETAILED DESCRIPTION

Figure 1:
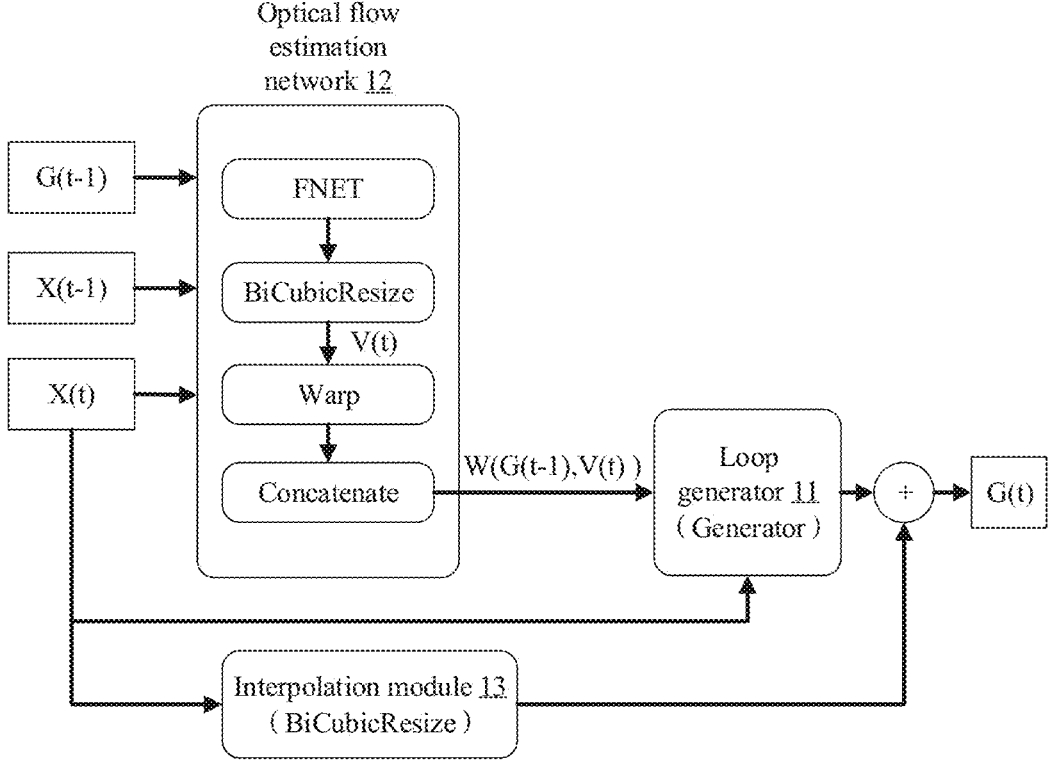
FIG. 1 is a basic architecture of a picture processing network.

The embodiment of the present disclosure provides a method for picture processing including following operations.

Data of a search window is loaded from a memory cell array and the data of the search window is cached to a register array, where sample data of a reference picture is stored in the memory cell array.

Grouping search is performed on the register array based on motion trajectories of multiple samples in a current picture, and sample data of reference points corresponding to the multiple samples is outputted in parallel.

Sample data of the multiple samples is determined based on the sample data of the reference points.

In some embodiments, the memory cell array includes M horizontally distributed memory cells, and each of the memory cells includes N vertically distributed memory spaces, where M and N are integers greater than 1.

The operation that the data of the search window is loaded from the memory cell array and the data of the search window is cached to the register array includes following operations.

Loading information of the search window is acquired, where the loading information includes a chip select signal and address information of the memory cell.

At least two adjacent memory cells are selected from the M memory cells based on the chip select signal.

Based on the address information, a row of valid data in the search window is loaded from memory spaces of the at least two memory cells and the row of valid data is cached to the register array, until all valid data of the search window are loaded.

In some embodiments, the method further includes following operation.

A movement of the search window is controlled in an order from top to bottom and from left to right by taking an top-left corner of the reference picture as a starting position of the search window, and the loading information of the search window is updated.

In some embodiments, the method further includes following operation.

After the search window moves in the order from top to bottom to a first boundary position, a row of valid data at a top starting position of the search window at a next column is loaded within each clock cycle, and the row of the valid data is cached to the register array, until the search window moves to a second boundary position.

The reference picture includes valid data and boundary padding data, and the first boundary position is a lower boundary of the valid data and the second boundary position is a lower boundary of the boundary padding data.

In some embodiments, the operation that the grouping search is performed on the register array based on the motion trajectories of the multiple samples in the current picture, and the sample data of the reference points corresponding to the multiple samples is outputted in parallel includes following operation.

At least two groups of selecting modules are controlled to perform grouping selection on the register array based on the motion trajectories of the multiple samples in the current picture, and sample data of multiple reference points is outputted in parallel, where different groups of the selecting modules are provided with different types of multiplexers.

An i-th group of the selecting modules includes multiple i-th type of the multiplexers used for selecting an output from multiple inputs, where i is an integer greater than 1;

The register array is divided into multiple register subarrays, when i is 1, the multiple inputs of the i-th type of the multiplexers are sample data of reference points of multiple registers in the register subarray.

When i is greater than 1, the multiple inputs of the i-th type of the multiplexers are sample data of reference points outputted by multiple i–1-th type of the multiplexers.

In some embodiments, the at least two groups of selecting modules are four groups of selecting modules.

The first group of selecting modules includes a 16-to-1 multiplexer.

The second group of selecting modules includes a 64-to-1 multiplexer.

The third group of selecting modules includes a 48-to-1 multiplexer.

The fourth group of selecting modules includes a 32-to-1 multiplexer.

The embodiment of the present disclosure also provides a chip for picture processing, including a memory cell array, a register array and a processor.

The memory cell array is configured to store sample data of a reference picture.

The register array is configured to cache data of a search window.

The processor is configured to: load the data of the search window from the memory cell array and cache the data of the search window to the register array; read in parallel, based on motion trajectories of multiple samples in a current picture, sample data of reference points corresponding to the multiple samples from the register array; and determine sample data of the multiple samples based on the sample data of the reference points.

In some embodiments, the memory cell array includes M horizontally distributed memory cells, and each of the memory cells includes N vertically distributed memory spaces, where M and N are integers greater than 1.

The processor is configured to: acquire loading information of the search window, where the loading information includes a chip select signal and address information of the memory cell; select at least two adjacent memory cells from the M memory cells based on the chip select signal; and based on the address information, load a row of valid data in the search window from memory spaces of the at least two memory cells and cache the row of valid data to the register array, until all valid data of the search window are loaded.

In some embodiments, the chip further includes at least two groups of selecting modules.

An i-th group of the selecting modules includes multiple i-th type of the multiplexers used for selecting an output from multiple inputs, where i is an integer greater than 1;

The register array is divided into multiple register subarrays, when i is 1, the multiple inputs of the i-th type of the multiplexers are sample data of reference points of multiple registers in the register subarray.

When i is greater than 1, the multiple inputs of the i-th type of the multiplexers are sample data of reference points outputted by multiple i–1-th type of the multiplexers.

The processor is configured to control at least two groups of selecting modules to perform grouping selection on the register array based on the motion trajectories of the multiple samples in the current picture, and output, in parallel, sample data of multiple reference points.

The embodiment of the present disclosure also provides an electronic device including a device for picture acquisition and any chip for picture processing provided by the embodiments of the present disclosure.

The embodiment of the present disclosure also provides a computer-readable storage medium having stored a computer program thereon that, when executed by a processor, causes the processor to implement the operations of any foregoing method for picture processing.

The embodiment of the present disclosure also provides a computer program product including multiple instructions that, when executed by a computing device, causes the computing device to implement the method.

In order to have a more detailed understanding of the features and technical contents of the embodiments of the present disclosure, the implementation of the embodiments of the present disclosure will be described in detail below in conjunction with the accompanying drawings. The accompanying drawings are for reference only and are not intended to limit the embodiments of the present disclosure.

At present, there is a problem in real-time video application on the mobile terminal. Due to the limitation of transmission bandwidth and the requirement of real-time, low-resolution video data is transmitted. However, in order to bring better visual experience to users, a resolution of a terminal display screen is generally high. Therefore, there is a problem that the resolution of the transmitted video data does not match with the resolution of the terminal display screen. In order to solve the problem of the resolution mismatch, it is necessary to improve the resolution of the video data to be displayed.

Video super-resolution technology is different from super-resolution task for a single picture in that the video super-resolution technology not only is required to generate pictures with rich details in space, but also keeps the coherence between the pictures.

At present, video super-resolution technology regards video super-resolution problem as multiple super-resolution tasks for single picture. Each super-resolution task is responsible for generating a high-resolution picture according to the inputted low-resolution picture. Due to the lack of connection between the various generated high-resolution pictures, the time continuity is poor and artifacts appear for the generated high-resolution pictures. Moreover, the computational complexity is relatively high.

In order to solve the problem of the time continuity, at present, the latest algorithm research result is that a previous picture is considered when the next picture is generated. The previous picture is inputted into the picture processing network to improve the time continuity, which may produce a result having the time continuity and make the generated high-resolution pictures smoother and more natural.

FIG. 1 is a basic architecture of a picture processing network. The picture processing network includes three components: a loop generator 11, an optical flow estimation network 12 and an interpolation module 13. The implementation formula of the picture processing network is as follows.

$$Vt = BicubicResize(F(X(t-1), X(t)))$$

$$G(t) = G(X(t), W(G(t-1), V(t)) + BicubicResize(X(t)))$$

The optical flow estimation network 12 includes four parts: FNET, BicubicResize, Warp and Concatenate, the inputs of the optical flow estimation network 12 are G(t−1), X(t−1) and X(t), G(t−1) is the previous picture generated by the picture processing network and is taken as a reference picture of the current picture; and X(t) and X(t−1) are the inputted low-resolution pictures respectively. The two pictures are inputted into the FNET of the optical flow estimation network 12, which outputs F (X(t−1), X(t)), and then the coordinate offset Vt=BicubicResize (F (X(t−1), X(t)) of the current picture is obtained by the BicubicResize operator. For each sample to be generated, Warp operator is required to find a reference point W (G(t−1), Vt) in G(t−1) picture based on the predicted motion trajectory Vt. The loop generator 11 (Generator) generates G(X(t), W (G(t−1), V (t))) based on W (G(t−1), Vt) and the low-resolution picture X(t). The interpolation module 13 (BicubicResize) performs the cubic interpolation operation on X(t) to generate BicubicResize (X(t)). The results of the loop generator 11 and the interpolation module 13 are added to obtain the current picture G(t).

At present, the difficulty in the latest video super-resolution algorithm lies in the hardware implementation of the reference point reading. In view of this, the embodiment of the present disclosure provides a method for picture processing, to implement the parallel reading of reference points.

Figure 2:
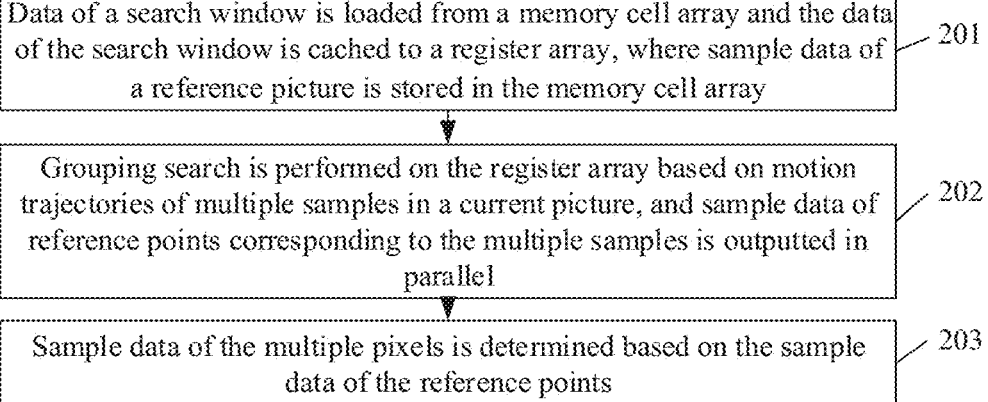
FIG. 2 is a schematic diagram of a first flowchart of a method for picture processing according to an embodiment of the present disclosure.

FIG. 2 is a schematic diagram of a first flowchart of a method for picture processing according to an embodiment of the present disclosure. As illustrated in FIG. 2, the method may specifically include operations 201 to 203.

In operation 201, data of a search window is loaded from a memory cell array and the data of the search window is cached to a register array, where sample data of a reference picture is stored in the memory cell array.

The search window may be understood as a search scope for a reference point of a sample to be generated. For example, the latest video super-resolution algorithm stipulates that when each sample is generated, a reference point is required to be found within the range of plus or minus 16 samples at the same position in the previous picture G(t−1) (i.e., the reference picture) and to be outputted. If 16 samples are outputted simultaneously, then a selection is required to be performed on (16+16+16)*(16+16+1)=1584 samples. In practical application, the size of the window may be adjusted to 48*32=1536.

Since the memory cell array stores the sample data of the whole reference picture, data of the search window is required to be loaded from the memory cell array and cached to the register array, and then the parallel reading is performed on the register array.

In some embodiments, the memory cell array includes M horizontally distributed memory cells, and each of the memory cells includes N vertically distributed memory spaces, where M and N are integers greater than 1. The sample data of reference pictures are stored in groups by multiple memory cells, which facilitates loading the data of the search window.

Figure 3:
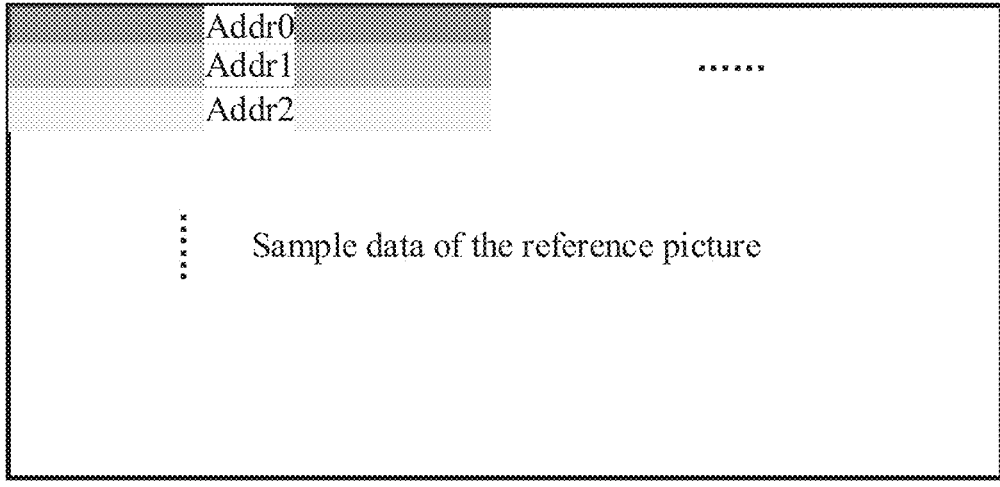
FIG. 3 is a storage structure of sample data of a reference picture in an embodiment of the present disclosure.

Exemplarily, FIG. 3 is a storage structure of sample data of a reference picture in an embodiment of the present disclosure. As illustrated in FIG. 3, each row of samples in the reference picture occupies a memory space corresponding to one memory cell address, and the reference pictures are grouped and stored in the memory cell array.

Figure 4:
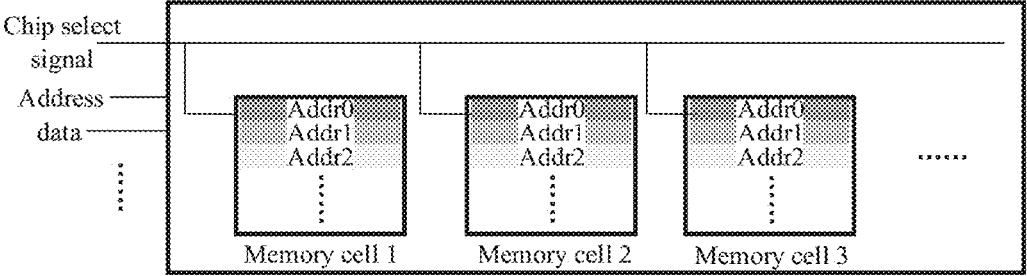
FIG. 4 is a schematic structural diagram of a memory cell array in an embodiment of the present disclosure.

FIG. 4 is a schematic structural diagram of a memory cell array in an embodiment of the present disclosure. As illustrated in FIG. 4, a chip select signal is used for selecting the memory cell, each memory cell occupies multiple addresses. The memory space to be read is determined by inputting the address, and then the sample data of a row of reference points stored in the read memory space is read, and is cached to the register array.

Exemplarily, the search window has a size of 48*32, and each memory cell storing the data has the width of 16 bytes. Various memory cells share an address interface, and the memory cell is selected by the chip select signal. For example, it is assumed that the picture has the size of 128×64 bytes, then 128/16=8 memory cells are required for storing, and each memory cell actually occupies 64 addresses. When data is required to be read from the memory cell, the memory cell to be read is selected by the chip select signal; the addresses are inputted into the memory cell to read the data from the memory cell; and the read data is stored in the register array. The size of the register array is fine-tuned according to the size of the window. For example, the size of the register array is fine-tuned from 48×33 to 48×32=1536.

Specifically, the operation that the data of the search window is loaded from the memory cell array and the data of the search window is cached to the register array includes the follow operations: loading information of the search window is acquired, where the loading information includes a chip select signal and address information of the memory cell; at least two adjacent memory cells are selected from the M memory cells based on the chip select signal; and based on the address information, a row of valid data in the search window is loaded from memory spaces of the at least two memory cells and the row of valid data is cached to the register array, until all valid data of the search window are loaded.

Exemplarily, in some embodiments, the method further includes: a movement of the search window is controlled in an order from top to bottom and from left to right by taking an top-left corner of the reference picture as a starting position of the search window, and the loading information of the search window is updated.

The reference points of several samples in the current picture may be searched from one search window. After the samples are determined, the search window is required to be moved, and the data of the search window cached in the register array is required to be updated to search for the reference points of other samples in the current picture.

Figure 5:
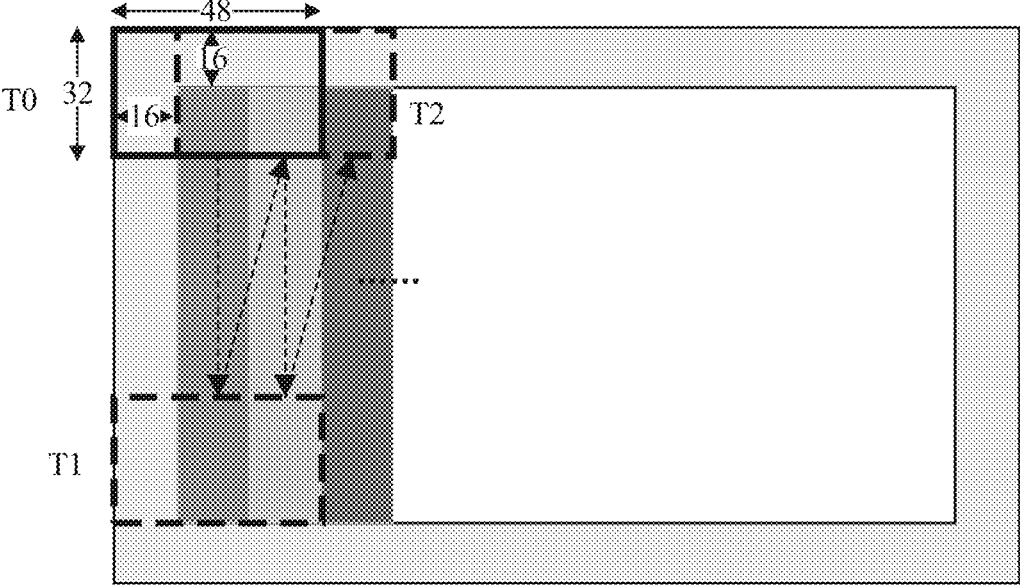
FIG. 5 is a first schematic diagram of a movement trajectory of a search window in an embodiment of the present disclosure.

The reference picture includes valid data and boundary padding data. Exemplarily, FIG. 5 is a schematic diagram of a movement trajectory of a search window in an embodiment of the present disclosure. As illustrated in FIG. 5, the valid data of the reference picture is in the middle white box, and the gray parts around the white box represent the boundary padding data (Padding). The boundary padding data may also be understood as invalid data. At the initial stage, the position in the upper left corner is taken as the starting position of the search window. At this time, when the data is loaded for the first time, only 32*16 sample data is required to be read from the memory cell, and other data is the Padding data that is not required to be read from the memory cell. Two memory cells are selected by the chip select signal and respectively correspond to the front two memory cells in FIG. 5. One row of valid data is read per clock cycle, 16 clock cycles in total are used to fill the valid data in the window, and the values of the Padding data are configured through the registers and are not required to be read from the memory cells. As can be seen from FIG. 5, when the window slides from the top every time, 16 clock cycles are required to fill the registers with the valid data, and other data is the Padding data. When the sliding window moves down from the top, only one row of data is required to be read from each memory cell per clock cycle, the one row of register data on the top of the register is eliminated. The data moves up one row as a whole, the one row of data read from the memory cell is put into the bottom row, and other sample data is multiplexed, then the new data of the sliding window may be generated. According to the sample data storage format illustrated in FIG. 4, the new data of the window may be generated by reading only the data of two or three memory cells every time, thereby making full use of parallelism degree.

Figure 6:
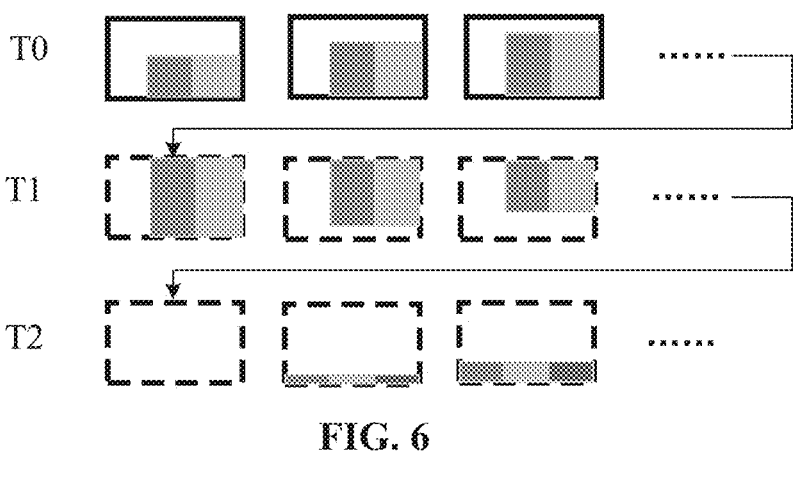
FIG. 6 is a schematic diagram of a first flowchart of a data loading mode in an embodiment of the present disclosure.

FIG. 6 is a schematic diagram of a first flowchart of a data loading mode in an embodiment of the present disclosure. As illustrated in FIG. 6, when the search window moves from top to bottom, i.e., from moment T0 to moment T1, the search window also needs to move down to the lowest end from the position corresponding to the moment T1, which indicates that the vertical movement at the column is completed. When the search window completes the vertical movement at the column, the search window needs to move horizontally to the top, i.e., the position corresponding to moment T2, of the picture to perform the data loading at the next column, and the same operation of data loading is repeated.

As illustrated in FIG. 6, the search window needs to move down to the lowest end from the position corresponding to the moment T1, and the data in the window is gradually replaced by the Padding data. After 16 clock cycles, the search window moves to the lowest end, and then turns to the top of the picture to continue loading data. At this time, at the moment T2, 16 clock cycles are also required to perform the data loading. Since the required valid data in the duration from the moment T1 to the moment when the search window moves to the bottom end is unchanged, and is already in the search window, and the update of the data of the search window in this duration does not affect acquiring the sample data of the reference point.

In view of this, the embodiment of the present disclosure also provides another optional data loading flow. Specifically, the method further includes: after the search window moves in the order from top to bottom to a first boundary position, a row of valid data at a top starting position of the search window at a next column is loaded within each clock cycle, and the row of the valid data is cached to the register array, until the search window moves to a second boundary position, where the reference picture includes valid data and boundary padding data, and the first boundary position is a lower boundary of the valid data, i.e., the search window corresponding to the moment T1, and the second boundary position is a lower boundary of the boundary padding data.

Figure 7:
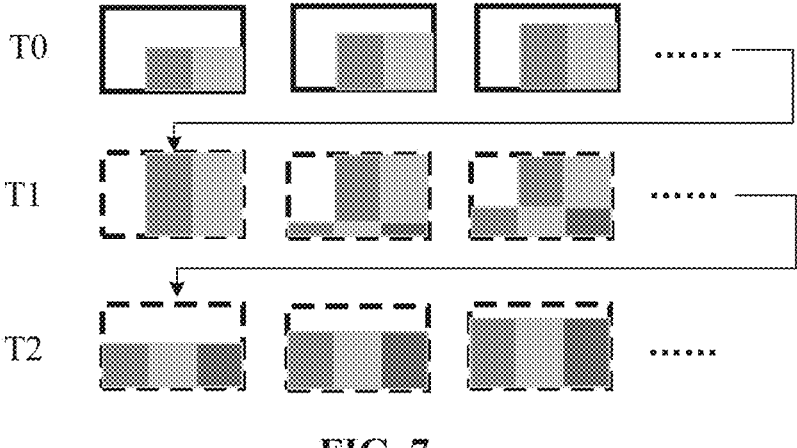
FIG. 7 is a schematic diagram of a second flowchart of a data loading mode in an embodiment of the present disclosure.

FIG. 7 is a schematic diagram of a second flowchart of a data loading mode in an embodiment of the present disclosure. As illustrated in FIG. 7, in the duration from the moment T1 to the moment T2, every time the window moves down, a row of data in the search window will be eliminated and there is no need to read new valid data from the memory cell to cache to the register array. Therefore, in the duration, the data required in the search window corresponding to the moment T2 may be loaded by using the reading interface of the memory cell. In this way, after 16 clock cycles, the data required in the search window at the moment T2 is ready, which saves the time of reloading the required valid data when the search window moves to the top every time, accelerates the speed of the data loading and improves the parallelism degree of hardware.

In operation 202, grouping search is performed on the register array based on motion trajectories of multiple samples in a current picture, and sample data of reference points corresponding to the multiple samples is outputted in parallel.

Figure 8:
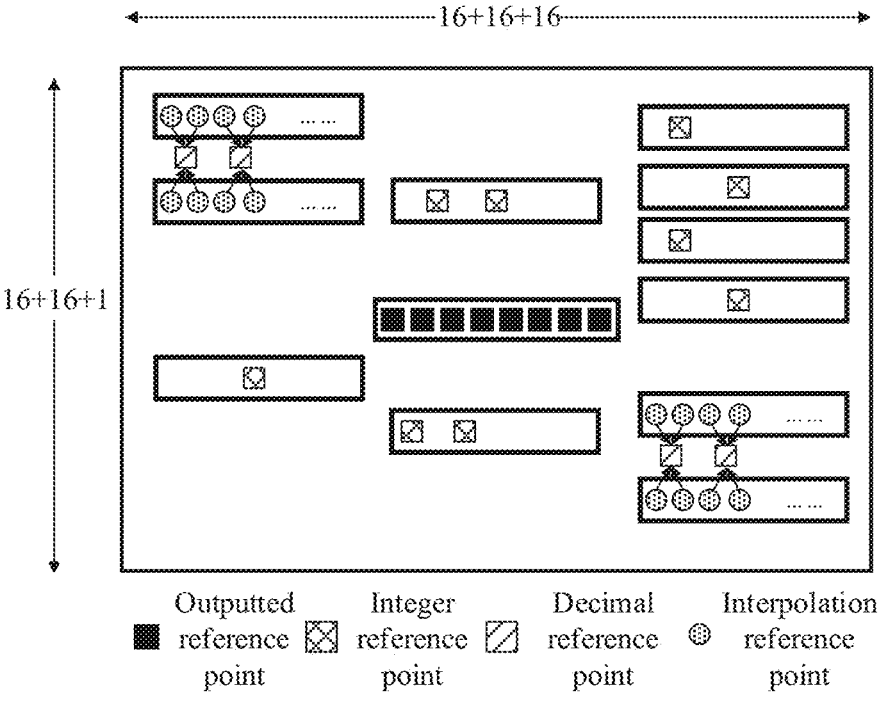
FIG. 8 is a schematic diagram of reference point distribution of a search window in an embodiment of the present disclosure.

How to find the corresponding reference points in the fixed search window is particularly important. As illustrated in FIG. 8, the latest video super-resolution algorithm stipulates that when each sample is generated, a reference points is required to be found within the range of plus or minus 16 samples at the same position in the reference picture G(t−1). There are two cases. The first case is that the motion trajectory is an integer, then the corresponding sample may be found directly in the inputted reference picture. The second case is that the motion trajectory is a decimal, the interpolation is required to be performed on four points around to obtain a new sample. Therefore, if 16 points are generated every time according to the minimum processing unit of the hardware, then at least 16 points are required to be read every time, and at most 16*4-64 points are required to be read every time, so that the minimum processing unit of the hardware may generate 16 samples every time. In FIG. 8, there are 16 samples to be outputted in the black box at the center of the search window, and the reference point of each sample may be an integer reference point (i.e. a reference point whose coordinate offset is an integer) or a decimal reference point (i.e. a reference point whose coordinate offset is a decimal). If the reference point is the integer reference point, the corresponding sample may be just found in G(t−1) picture. If the reference point is the decimal reference point, the interpolation is required to be performed by using the surrounding four decimal reference points to obtain the new sample. Since the generation of each output sample needs to refer to the range of plus or minus 16, if 16 samples are outputted simultaneously, then a selection is required to be performed on (16+16+16)*(16+16+1)=1584 samples. In practical application, the size of the window may be adjusted to 48*32=1536.

Specifically, after the data of the search window is obtained, a grouping search is performed on the register array based on the motion trajectories. Herein, the grouping search is that the register array is divided into register subarrays having different sizes, and different types of multiplexers are used to perform the searching on the register subarrays. Exemplarily, the types of the multiplexers include: 4-to-1, 8-to-1, 16-to-1, 32-to-1, 48-to-1, 64-to-1, and the like. In practical application, at least two types of multiplexers may be selected according to the size and division mode of the register array, so as to implement grouping selection of the register array.

Exemplarily, if the search window has the size of 48*32, the register array includes 48*32 registers, with a total of 1536 registers. Due to the huge amount of the data of the window, and one sample is selected from about 1600 samples, if one type of multiplexer (for example, it is unrealistic to select 16 1600-to-1 multiplexers) is used for performing the searching on the register array directly, the inputs of the used multiplexer is too much, which will bring great difficulties to layout and wiring. The embodiment of the present disclosure provides a register array grouping search structure, which can effectively reduce the inputs of the multiplexer, thereby simplifying the layout and wiring of the multiplexer and effectively reducing the difficulty of hardware design. The grouping search structure is illustrated by examples below.

In some embodiments, the size of the register array may also be larger than the size of the search window, and the register array may cache the data of the search window having the size same as or smaller than the size of the register array.

Exemplarily, in some embodiments, the operation that the grouping search is performed on the register array based on the motion trajectories of the multiple samples in the current picture, and the sample data of the reference points corresponding to the multiple samples is outputted in parallel includes: at least two groups of selecting modules are controlled to perform grouping selection on the register array based on the motion trajectories of the multiple samples in the current picture, and sample data of multiple reference points is outputted in parallel, where different groups of the selecting modules are provided with different types of multiplexers.

An i-th group of the selecting modules includes multiple i-th type of the multiplexers used for selecting an output from multiple inputs; the register array is divided into multiple register subarrays, when i is 1, the multiple inputs of the i-th type of the multiplexers are sample data of reference points of multiple registers in the register subarray; when i is greater than 1, the multiple inputs of the i-th type of the multiplexers are sample data of reference points outputted by multiple i−1-th type of the multiplexers.

The at least two groups of selecting modules are cascaded together in grouping order, between the adjacent selecting modules, the outputs of a previous group of multiple multiplexers are used as multiple inputs of the subsequent group of multiple multiplexers. The inputs of the first group of multiplexers are sample data of reference points in the registers, and the last group of multiplexers output, in parallel, sample data of multiple searched reference points. According to the grouping search structure in the present disclosure, the inputs of the multiplexer can be effectively reduced, the layout and wiring of the multiplexer is simplified, and the difficulty of the hardware design can be effectively reduced.

In some embodiments, the method further includes: the number of the multiplexers in each group of selecting modules is determined based on a size and a parallelism degree of the register array.

Exemplarily, the motion trajectory of each of the samples includes a first offset in an X direction and a second offset in a Y direction. The coordinates of the reference point are determined based on the first offset, the second offset and the coordinates of the sample. The selection paths of the at least two groups of selecting modules are determined based on the coordinates of the reference points. The sample data of the reference points is acquired based on the selection paths.

Exemplarily, the at least two groups of selecting modules are four groups of selecting modules, a first group of selecting modules includes a 16-to-1 multiplexer, a second group of selecting modules includes a 64-to-1 multiplexer, a third group of selecting modules includes a 48-to-1 multiplexer, and a fourth group of selecting modules includes a 32-to-1 multiplexer.

Exemplarily, the register array includes 48*32 registers and has a parallelism degree of 16.

The fourth group of selecting modules includes 16 32-to-1 multiplexers, to implement the selection of 16 inputs from 32 inputs. The third group of selecting modules includes 16 48-to-1 multiplexers, to implement the selection of 16 inputs from 48 inputs. The second group of selecting modules includes 16 64-to-1 multiplexers, to implement the selection of 16 inputs from 64 inputs. The first group of selecting modules includes 4 16-to-1 multiplexers, to implement the selection of 4 inputs from 16 inputs.

Figure 9:
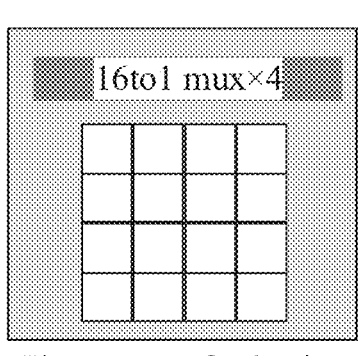
FIG. 9 is a schematic diagram of a first group of selecting modules performing grouping search on registers in an embodiment of the present disclosure.
Figure 10:
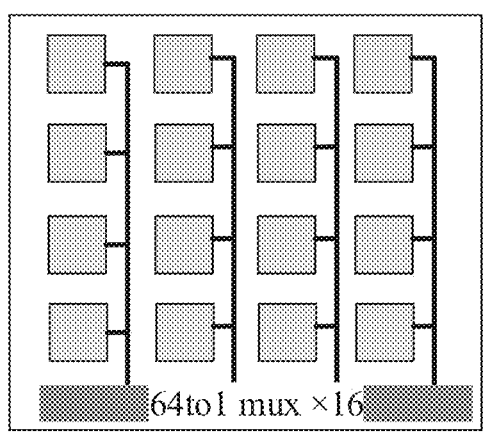
FIG. 10 is a schematic diagram of a second group of selecting modules performing grouping search on registers in an embodiment of the present disclosure.
Figure 11:
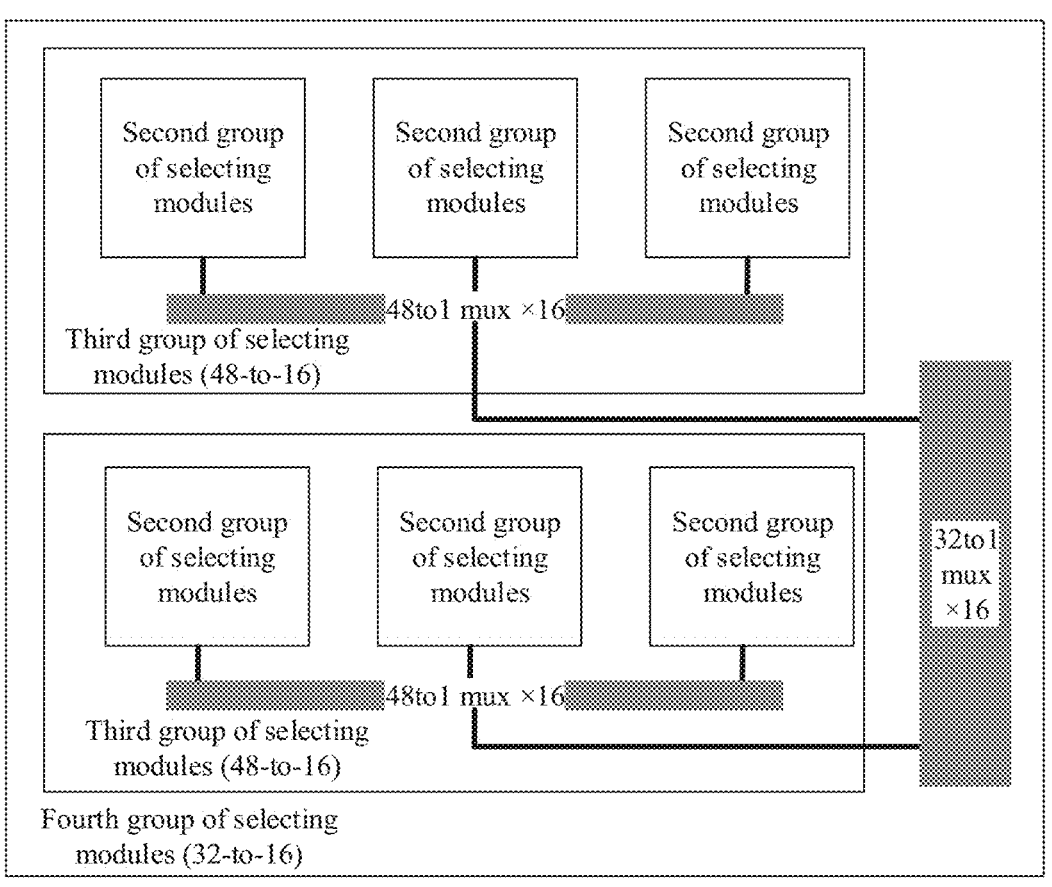
FIG. 11 is a schematic diagram of a third group of selecting modules and a fourth group of selecting modules performing grouping search on registers in an embodiment of the present disclosure.

FIG. 9 to FIG. 11 are schematic diagrams of the register grouping search structure in embodiments of the present disclosure. A register array having a size of 48*32 is divided into 96 register subarrays having a size 4*4, and the grouping search is performed on the register array by taking four groups of selecting modules as an example. As illustrated in FIG. 9, at the innermost layer, 4 samples are selected as outputs for every 16 samples. That is to say, the 16-to-4 operation of the 4*4 register subarray is implemented through the first group of selecting modules, and the specification of the multiplexer (mux) is 16-to-1. As illustrated in FIG. 10, in the first middle layer, each of the first groups of selecting modules outputs 4 samples, and the second group of selecting module selects 16 points from 64 points outputted by 16 first groups of selecting modules for output.

That is to say, the second group of selecting modules includes 16 64-to-1 multiplexers to implement 64-to-16 operation, and the operation performed by the second group of selecting modules may be understood as selecting 16 points from 16*16 register subarrays for output. As illustrated in FIG. 11, in the second middle layer, every three second groups of selecting modules form one group to output 48 samples, and the third group of selecting modules selects 16 points from the 48 points for output, and thus, 16 48-to-1 multiplexers are used to implement the 48-to-16 operation. The operation performed by the third group of selecting modules may be understood as selecting 16 points from the 48*16 register subarrays for output. At the outermost layer, every two third groups of selecting modules form one group to output 32 samples, and finally 16 samples are selected from the 32 samples as output, and thus, 16 32-to-1 multiplexers are used. The operation performed by the fourth group of selecting modules may be understood as selecting 16 points from the whole register array for output. Therefore, in the scheme, the 1600-to-1 multiplexer is divided into four types of multiplexers: 64-to-1, 48-to-1, 32-to-1 and 16-to-1, which is more beneficial to hardware implementation and avoids the problem of layout and wiring.

In operation 203, sample data of the multiple samples is determined based on the sample data of the reference points.

Exemplarily, the motion trajectory of each of the samples includes a first offset in an X direction and a second offset in a Y direction. The operation that the sample data of the multiple samples is determined based on the sample data of the reference points includes: when the first offset and the second offset are integers, sample data of a reference point to is outputted as the sample data of the sample; and when the first offset or the second offset is a decimal, sample data of multiple reference points is acquired, and an interpolation operation is performed on the sample data of the multiple reference points to obtain the sample data of the sample in the current picture. For example, when any one of the offsets is the decimal, the sample data of surrounding four reference points is acquired, and the interpolation operation is performed on the sample data of the four reference points to obtain the sample data of the sample in the current picture.

That is to say, each sample corresponds to one or more reference points. When each sample corresponds to one reference point, the sample data of the reference point is directly taken as the sample data of the sample in the current picture. When each sample corresponds to multiple reference points, the interpolation operation is performed on the sample data of the multiple reference points to obtain the sample data of the sample in the current picture.

Figures 12, 13:
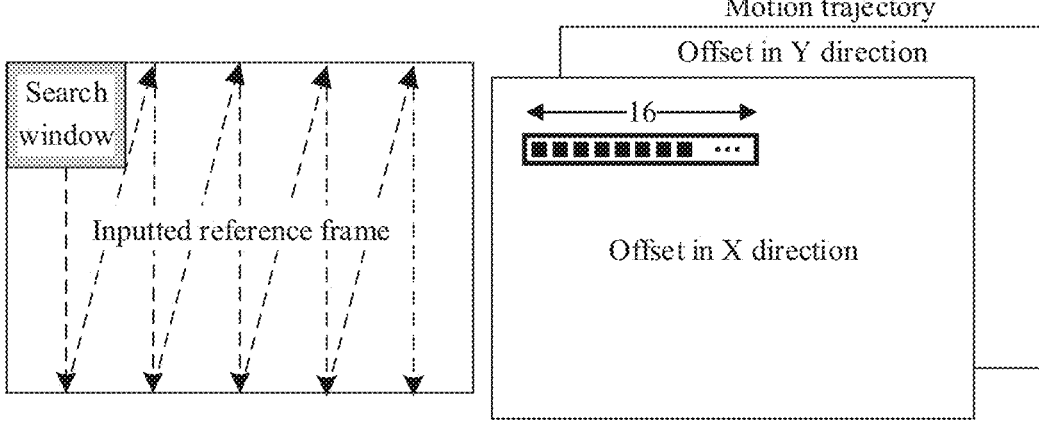
FIG. 12 is a second schematic diagram of a movement trajectory of a search window in an embodiment of the present disclosure.
FIG. 13 is a schematic diagram of a storage format of a motion trajectory in an embodiment of the present disclosure.
Figure 14:
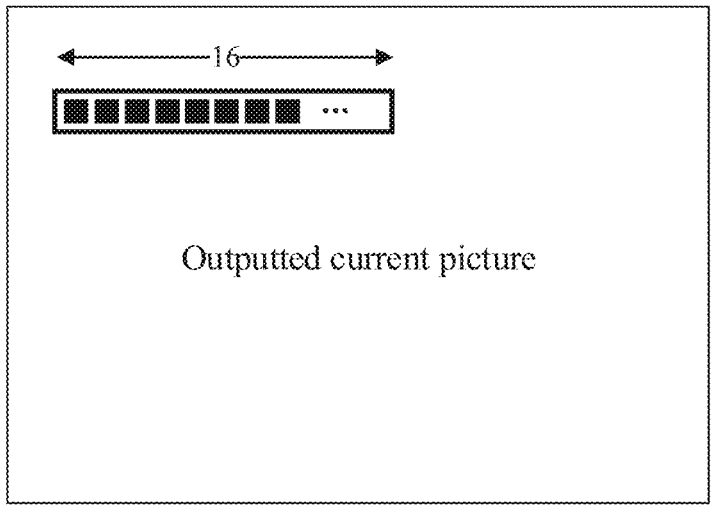
FIG. 14 is a schematic diagram of positions of 16 samples in a current picture in an embodiment of the present disclosure.

FIG. 12 to FIG. 14 are schematic diagrams of a second flowchart of the method for picture processing according to embodiments of the present disclosure. The data of the search window is loaded based on the movement trajectory of the search window illustrated in FIG. 12. FIG. 13 illustrates a motion trajectory of each sample in the current picture generated by the optical flow estimation network, and the motion trajectory includes two channels of data, i.e., sample offsets in the X and Y directions. As illustrated in FIG. 14, in order to simultaneously obtain 16 samples in the current picture, a reference point of each sample is required to be found in the search window based on the motion trajectory of the sample and the sample data of the reference point is read, thereby obtaining the sample data of 16 samples based on the sample data of the reference point.

By adopting the aforementioned technical schemes, the data of the search window is loaded from the memory cell array and cached into the register array, and the reference points of multiple samples may be read in parallel from the register array within several clock cycles or even one clock cycle. Therefore, the problem of the access conflict caused by directly reading the memory cell is solved, and the efficiency for reading the reference points is improved. The grouping search is implemented on the register array by using different types of multiplexers, which simplifies the layout and wiring of the multiplexers.

Figure 15:
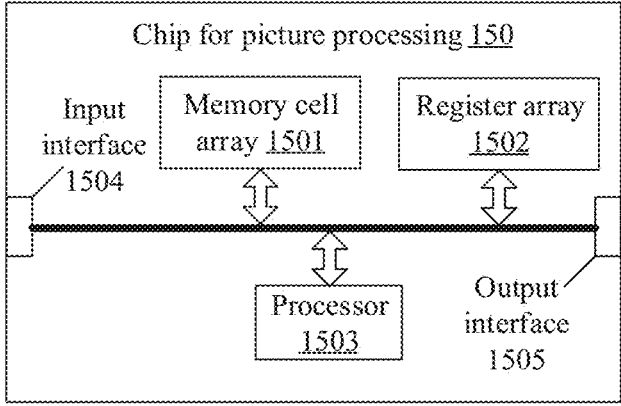
FIG. 15 is a schematic structural diagram of a chip for picture processing in an embodiment of the present disclosure.

In order to implement the method of the embodiments of the present disclosure, the embodiment of the present disclosure also provides a chip for picture processing. As illustrated in FIG. 15, the chip for picture processing 150 includes a memory cell array 1501, a register array 1502 and a processor 1503.

The memory cell array 1501 is configured to store sample data of a reference picture.

The register array 1502 is configured to cache data of a search window.

The processor 1503 is configured to: load the data of the search window from the memory cell array 1501 and cache the data of the search window to the register array 1502; read in parallel, based on motion trajectories of multiple samples in a current picture, sample data of reference points corresponding to the multiple samples from the register array 1502; and determine sample data of the multiple samples based on the sample data of the reference points.

In some embodiments as illustrated in FIG. 4, the memory cell array 1501 includes M horizontally distributed memory cells, and each of the memory cells includes N vertically distributed memory spaces, where M and N are integers greater than 1.

The processor is configured to: acquire loading information of the search window, where the loading information includes a chip select signal and address information of the memory cell; select at least two adjacent memory cells from the M memory cells based on the chip select signal; and based on the address information, load a row of valid data in the search window from memory spaces of the at least two memory cells and cache the row of valid data to the register array, until all valid data of the search window are loaded.

In some embodiments, the processor 1503 is configured to: control a movement of the search window in an order from top to bottom and from left to right by taking an top-left corner of the reference picture as a starting position of the search window, and update the loading information of the search window.

In some embodiments, a processor 1503 is configured to: after the search window moves in the order from top to bottom to a first boundary position, load, within each clock cycle, a row of valid data at a top starting position of the search window at a next column and cache the row of the valid data to the register array, until the search window moves to a second boundary position.

The reference picture includes valid data and boundary padding data, and the first boundary position is a lower boundary of the valid data and the second boundary position is a lower boundary of the boundary padding data.

In some embodiments, the chip further includes at least two groups of selecting modules.

An i-th group of the selecting modules includes multiple i-th type of the multiplexers used for selecting an output from multiple inputs, where i is an integer greater than 1.

The register array is divided into multiple register subarrays, when i is 1, the multiple inputs of the i-th type of the multiplexers are sample data of reference points of multiple registers in the register subarray When i is greater than 1, the multiple inputs of the i-th type of the multiplexers are sample data of reference points outputted by multiple i−1-th type of the multiplexers.

The processor is configured to control at least two groups of selecting modules to perform grouping selection on the register array based on the motion trajectories of the multiple samples in the current picture, and output, in parallel, sample data of multiple reference points.

That is to say, the at least two groups of selecting modules are cascaded together in grouping order, between the adjacent selecting modules, the outputs of a previous group of multiple multiplexers are used as multiple inputs of the subsequent group of multiple multiplexers. The inputs of the first group of multiplexers are sample data of reference points in the registers, and the last group of multiplexers output, in parallel, sample data of multiple searched reference points. According to the grouping search structure in the present disclosure, the inputs of the multiplexer can be effectively reduced, the layout and wiring of the multiplexer is simplified, and the difficulty of the hardware design can be effectively reduced.

In some embodiments, the at least two groups of selecting modules are four groups of selecting modules.

The first group of selecting modules includes a 16-to-1 multiplexer.

The second group of selecting modules includes a 64-to-1 multiplexer.

The third group of selecting modules includes a 48-to-1 multiplexer.

The fourth group of selecting modules includes a 32-to-1 multiplexer.

Alternatively, the chip for picture processing 150 may also include an input interface 1504 and communicates with other devices or chips through the input interface 1504. In particular, the input interface 1504 may acquire information or data from other devices or chips.

Alternatively, the chip for picture processing 150 may also include an output interface 1505 and communicates with other devices or chips through the output interface 1505. In particular, the output interface 1505 may output information or data from other devices or chips.

Alternatively, the chip for picture processing 150 may be applied to an electronic device in the embodiment of the present disclosure.

It is to be understood that the chip in the embodiments of the present disclosure may also be a system-level chip, a system chip, a chip system or an on-chip system chip.

In practical applications, the various components in the chip for picture processing 150 are coupled together through a bus system. It is to be understood that the bus system is configured to implement the connection communication between these components. The bus system includes a power bus, a control bus and a status signal bus in addition to a data bus.

In practical application, the processor can be at least one of: an Application Specific Integrated Circuit (ASIC), a Digital Signal Processing Device (DSPD), a Programmable Logic Device (PLD), a Field-Programmable Gate Array (FPGA), a controller, a microcontroller or a microprocessor. It is to be understood that the electronic device for implementing the processor functions described above may be other for different devices, which is not specifically limited in the embodiments of the present disclosure.

The memory cell may be volatile memory, such as a Static Random-Access Memory (SRAM), or may be a non-volatile memory, such as a Random-Access Memory (RAM), or a flash memory.

By adopting the chip for picture processing, the data of the search window is loaded from the memory cell array and cached into the register array, and the reference points of multiple samples may be read in parallel from the register array within several clock cycles or even one clock cycle. Therefore, the problem of the access conflict caused by directly reading the memory cell is solved, and the efficiency for reading the reference points is improved. The grouping search is implemented on the register array by using different types of multiplexers, which can simplify the layout and wiring of the multiplexers.

The embodiments of the present disclosure also provide an electronic device, which may include, for example, a mobile phone, a tablet computer, a notebook computer, a palmtop computer, a Personal Digital Assistant (PDA), a Portable Media Player (PMP), a wearable device, a camera, a smart car, and the like.

Figure 16:
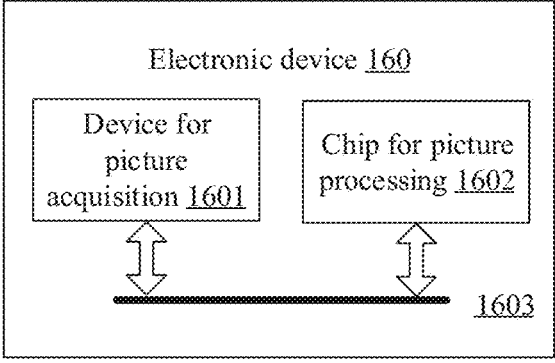
FIG. 16 is a schematic structural diagram of an electronic device in an embodiment of the present disclosure.

As illustrated in FIG. 16, the electronic device 160 includes a device for picture acquisition 1601 and the chip for picture processing 1602.

The device for picture acquisition 1601 is configured to acquire sample data of a picture.

The chip for picture processing 1602 includes any one of the chips for picture processing in the embodiments of the present disclosure, and is configured to perform the operations of the method for picture processing in the embodiments of the present disclosure.

Of course, in practical applications, as illustrated in FIG. 16, the various components of the electronic device 160 are coupled together through a bus system 1603. It is to be understood that the bus system 1603 is configured to implement the connection communication between these components. The bus system 1603 includes a power bus, a control bus and a status signal bus in addition to a data bus. However, for clarity, the various buses are designated as the bus system 1603 in FIG. 16.

In exemplary embodiments, the embodiments of the present disclosure also provide a computer-readable storage medium, such as a memory including a computer program, the computer program is executable by a processor of the chip for picture processing to complete the operations of the foregoing method.

The embodiments of the present disclosure also provide a computer program product including computer program instructions.

Alternatively, the computer program product may be applied to the chip for picture processing in the embodiments of the present disclosure, and the computer program instructions cause the computer to perform the corresponding flow implemented by the chip for picture processing in the various methods in the embodiments of the present disclosure, which is not repeated here for the sake of brevity.

The embodiments of the present disclosure also provide a computer program.

Alternatively, the computer program may be applied to the chip for picture processing in the embodiment of the present disclosure, and when the computer program is executed by the computer, the computer performs the corresponding flow implemented by the chip for picture processing in the various methods in the embodiment of the present disclosure, which will not be repeated here for the sake of brevity.

In some examples, the terms "module" and the like as shown in FIGS. 9-11 may be implemented by one or more hardware circuits/sub-circuits and/or one or more processors. In some examples, a module may include one or more circuits with or without stored code or instructions. The module may include one or more components that are directly or indirectly connected. These components may or may not be physically attached to, or located adjacent to, one another.

The terminology used in the present disclosure is for the purpose of describing particular embodiments only and is not intended to limit the present disclosure. As used in the disclosure and the appended claims, the singular forms "a" "said" and "the" are also intended to include the plural forms unless the context clearly indicates otherwise. It is also to be understood that the term "and/or" used herein, refers to and encompasses any or all possible combinations of one or more associated listed items. In the embodiments of the present disclosure, to the expressions "have", "may have", "include", and "contain", or "may include", and "may include" may be used herein to indicate the presence of a corresponding feature (e.g., an element such as a value, a function, an operation, or a component), but do not exclude the presence of additional features.

It is to be understood that while the terms first, second, third, etc., may be used in the present disclosure to describe various information, such information should not be limited to such terms. These terms are used only to distinguish the same type of information from one another and are not used to describe a particular order or priority. For example, the first information may also be referred to as second information without departing from the scope of the present disclosure, and similarly, the second information may also be referred to as first information.

The technical schemes described in the embodiments of the present disclosure may be arbitrarily combined without conflict.

In some embodiments provided by the present disclosure, it is to be understood that the disclosed method, apparatus and device may be implemented in other manners. For example, the device embodiment described above is only schematic, and for example, division of the units is only a division of logic function, and other methods of division may be adopted during practical implementation. For example, multiple units or components may be combined or integrated into another system, or some characteristics may be neglected or not executed. In addition, coupling or direct coupling or communication connection between the components displayed or discussed may be indirect coupling or communication connection implemented through some interfaces, devices or the units, and may be electrical, mechanical or adopt other forms.

The units described as separate parts may or may not be physically separate, and parts displayed as units may or may not be physical units, and namely may be located in the same place, or may also be distributed to multiple network units. Some or all of the units may be selected to achieve the purpose of the solutions of the embodiments according to a practical requirement.

In addition, in various embodiments of the disclosure, each functional unit may be integrated into a processing unit, each unit may also physically exist independently, and two or more than two units may also be integrated into a unit. The integrated unit may be implemented in the form of hardware or in the form of a combination of the hardware and software functional units.

Disclosed above are merely several specific implementations of the disclosure and are not intended to limit the scope of protection of the present disclosure. Any variations or replacements apparent to those skilled in the art within the technical scope disclosed by the disclosure shall fall within the scope of protection of the disclosure.

INDUSTRIAL PRACTICABILITY

The embodiments of the present disclosure disclose a method and a chip for picture processing, an electronic device and a storage medium. The method includes: data of a search window is loaded from a memory cell array, where sample data of a reference picture is stored in the memory cell array and the data of the search window is cached to a register array; grouping search is performed on the register array based on motion trajectories of multiple samples in a current picture, and sample data of reference points corresponding to the multiple samples is outputted in parallel; sample data of the multiple samples is determined based on the sample data of the reference points. In this way, the data of the search window is loaded from the memory cell array and cached into the register array, and the reference points of multiple samples may be read in parallel from the register array within several clock cycles or even one clock cycle. Therefore, the problem of the access conflict caused by directly reading the memory cell can be solved, and the efficiency for reading the reference points is improved. The grouping search is implemented on the register array by using different types of multiplexers, which can simplify the layout and wiring of the multiplexers.

The invention claimed is:

1. A method for picture processing, comprising:
loading data of a search window from a memory cell array and caching the data of the search window to a register array, wherein sample data of a reference picture is stored in the memory cell array;
performing grouping search on the register array based on motion trajectories of a plurality of samples in a current picture, and outputting, in parallel, sample data of reference points corresponding to the plurality of samples; and
determining sample data of the plurality of samples based on the sample data of the reference points.

2. The method of claim 1, wherein the memory cell array comprises M horizontally distributed memory cells, and each of the memory cells comprises N vertically distributed memory spaces, where M and N are integers greater than 1, and
wherein loading the data of the search window from the memory cell array and caching the data of the search window to the register array comprises:
acquiring loading information of the search window, wherein the loading information comprises a chip select signal and address information of the memory cell;
selecting at least two adjacent memory cells from the M memory cells based on the chip select signal; and
based on the address information, loading a row of valid data in the search window from memory spaces of the at least two memory cells and caching the row of valid data to the register array, which are performed repeatedly until all valid data of the search window are loaded.

3. The method of claim 2, further comprising:
controlling a movement of the search window in an order from top to bottom and from left to right by taking an top-left corner of the reference picture as a starting position of the search window, and updating the loading information of the search window.

4. The method of claim 3, further comprising:
after the search window moves in the order from top to bottom to a first boundary position, loading, within each clock cycle, a row of valid data at a top starting position of the search window at a next column and caching the row of the valid data to the register array, until the search window moves to a second boundary position, wherein the reference picture comprises valid data and boundary padding data, and the first boundary position is a lower boundary of the valid data and the second boundary position is a lower boundary of the boundary padding data.

5. The method of claim 1, wherein performing the grouping search on the register array based on the motion trajectories of the plurality of samples in the current picture, and outputting, in parallel, the sample data of the reference points corresponding to the plurality of samples comprises:

controlling at least two groups of selecting circuits to perform grouping selection on the register array based on the motion trajectories of the plurality of samples in the current picture, and outputting, in parallel, sample data of a plurality of reference points, wherein different groups of the selecting circuits are provided with different types of multiplexers, wherein an i-th group of the selecting circuits comprises a plurality of i-th type of the multiplexers used for selecting an output from a plurality of inputs; and the register array is divided into a plurality of register subarrays, when i is 1, the plurality of inputs of the i-th type of the multiplexers are sample data of reference points of a plurality of registers in the register subarray;

when i is greater than 1, the plurality of inputs of the i-th type of the multiplexers are sample data of reference points outputted by a plurality of i−1-th type of the multiplexers.

6. The method of claim 5, wherein controlling the at least two groups of selecting circuits to perform the grouping selection on the register array based on the motion trajectories of the plurality of samples in the current picture, and outputting, in parallel, the sample data of the plurality of reference points comprises:

determining coordinates of the reference points based on the motion trajectories of the samples and coordinates of the samples, wherein each of the motion trajectories comprises a first offset in an X direction and a second offset in a Y direction;

determining selection paths of the at least two groups of selecting circuits based on the coordinates of the reference points; and acquiring the sample data of the reference points based on the selection paths.

7. The method of claim 5, wherein the at least two groups of selecting circuits are four groups of selecting circuits, wherein a first group of selecting circuits comprises a 16-to-1 multiplexer, a second group of selecting circuits comprises a 64-to-1 multiplexer, a third group of selecting circuits comprises a 48-to-1 multiplexer, and a fourth group of selecting circuits comprises a 32-to-1 multiplexer.

8. The method of claim 5, further comprising: determining a number of the multiplexers in each group of selecting circuits based on a size and a parallelism degree of the register array.

9. The method of claim 1, wherein determining the sample data of the plurality of samples based on the sample data of the reference points comprises:

acquiring the motion trajectories of the plurality of samples in the current picture, wherein the motion trajectory of each of the samples comprises a first offset in an X direction and a second offset in a Y direction;

when the first offset and the second offset are integers, acquiring sample data of a reference point to output as the sample data of the sample;

when the first offset or the second offset is a decimal, acquiring sample data of a plurality of reference points, and performing an interpolation operation on the sample data of the plurality of reference points to obtain the sample data of the sample.

10. A chip for picture processing, comprising a memory cell array, a register array, and a processor, wherein the memory cell array is configured to store sample data of a reference picture;

the register array is configured to cache data of a search window; and the processor is configured to: load the data of the search window from the memory cell array and cache the data of the search window to the register array; read in parallel, based on motion trajectories of a plurality of samples in a current picture, sample data of reference points corresponding to the plurality of samples from the register array; and determine sample data of the plurality of samples based on the sample data of the reference points.

11. The chip for picture processing of claim 10, wherein the memory cell array comprises M horizontally distributed memory cells, and each of the memory cells comprises N vertically distributed memory spaces, where M and N are integers greater than 1, the processor is configured to: acquire loading information of the search window, wherein the loading information comprises a chip select signal and address information of the memory cell; select at least two adjacent memory cells from the M memory cells based on the chip select signal; and based on the address information, load a row of valid data in the search window from memory spaces of the at least two memory cells and cache the row of valid data to the register array, which are performed repeatedly until all valid data of the search window are loaded.

12. The chip for picture processing of claim 11, wherein the processor is further configured to: control a movement of the search window in an order from top to bottom and from left to right by taking an top-left corner of the reference picture as a starting position of the search window, and update the loading information of the search window.

13. The chip for picture processing of claim 12, wherein the processor is further configured to: after the search window moves in the order from top to bottom to a first boundary position, load, within each clock cycle, a row of valid data at a top starting position of the search window at a next column and cache the row of the valid data to the register array, until the search window moves to a second boundary position, and wherein the reference picture comprises valid data and boundary padding data, and the first boundary position is a lower boundary of the valid data and the second boundary position is a lower boundary of the boundary padding data.

14. The chip for picture processing of claim 10, wherein the chip further comprises at least two groups of selecting circuits, wherein an i-th group of the selecting circuits comprises a plurality of i-th type of the multiplexers used for selecting an output from a plurality of inputs; and the register array is divided into a plurality of register subarrays, when i is 1, the plurality of inputs of the i-th type of the multiplexers are sample data of reference points of a plurality of registers in the register subarray;

when i is greater than 1, the plurality of inputs of the i-th type of the multiplexers are sample data of reference points outputted by a plurality of i–1-th type of the multiplexers, and the processor is configured to control at least two groups of selecting circuits to perform grouping selection on the register array based on the motion trajectories of the plurality of samples in the current picture, and output, in parallel, sample data of a plurality of reference points.

15. The chip for picture processing of claim 14, wherein the processor is configured to:

determine coordinates of the reference points based on the motion trajectories of the samples and coordinates of the samples, wherein each of the motion trajectories comprises a first offset in an X direction and a second offset in a Y direction;

determine selection paths of the at least two groups of selecting circuits based on the coordinates of the reference points; and acquire the sample data of the reference points based on the selection paths.

16. The chip for picture processing of claim 14, wherein the at least two groups of selecting circuits are four groups of selecting circuits, and wherein a first group of selecting circuits comprises a 16-to-1 multiplexer, a second group of selecting circuits comprises a 64-to-1 multiplexer, a third group of selecting circuits comprises a 48-to-1 multiplexer, and a fourth group of selecting circuits comprises a 32-to-1 multiplexer.

17. The chip for picture processing of claim 10, wherein the processor is configured to:

acquire the motion trajectories of the plurality of samples in the current picture, wherein the motion trajectory of each of the samples comprises a first offset in an X direction and a second offset in a Y direction;

when the first offset and the second offset are integers, acquire sample data of a reference point to output as the sample data of the sample;

when the first offset or the second offset is a decimal, acquire sample data of a plurality of reference points, and perform an interpolation operation on the sample data of the plurality of reference points to obtain the sample data of the sample.

18. A non-transitory computer-readable storage medium having stored a computer program thereon that, when executed by a processor, causes the processor to:

load search window data from a memory cell array and caching the search window data to a register array, wherein sample data of a reference picture is stored in the memory cell array;

perform grouping search on the register array based on motion trajectories of a plurality of samples in a current picture, and outputting, in parallel, sample data of reference points corresponding to the plurality of samples; and determine sample data of the plurality of samples based on the sample data of the reference points.

19. The chip for picture processing of claim 10, wherein the processor is configured to determine a number of the multiplexers in each group of selecting circuits based on a size and parallelism degree of the register array.

* * * * *